United States Patent
Cauchy et al.

(10) Patent No.: US 7,386,232 B1
(45) Date of Patent: Jun. 10, 2008

(54) METHOD AND SYSTEM FOR DIVERSE ROUTE COMPUTATION

(75) Inventors: Daniel C. Cauchy, San Jose, CA (US); Krishna Sundaresan, Sunnyvale, CA (US); Mahesh Chellappa, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 943 days.

(21) Appl. No.: 09/737,384

(22) Filed: Dec. 14, 2000

(51) Int. Cl.
*H04B 10/20* (2006.01)

(52) U.S. Cl. ............................ 398/58; 398/45; 398/57

(58) Field of Classification Search .............. 398/3–7, 398/45, 48, 57, 58; 370/468
See application file for complete search history.

(56) References Cited

U.S. PATENT DOCUMENTS

| | | | |
|---|---|---|---|
| 5,732,079 A | 3/1998 | Castrigno | |
| 5,781,529 A | 7/1998 | Liang et al. | |
| 5,920,705 A | 7/1999 | Lyon et al. | |
| 6,208,623 B1 | 3/2001 | Rochberger et al. | |
| 6,240,102 B1* | 5/2001 | Asano | 370/468 |
| 6,271,946 B1* | 8/2001 | Chang et al. | 398/79 |
| 6,272,139 B1 | 8/2001 | Soncodi | |
| 6,473,408 B1 | 10/2002 | Rochberger et al. | |
| 6,529,498 B1 | 3/2003 | Cheng | |
| 6,532,088 B1* | 3/2003 | Dantu et al. | 398/43 |
| 6,545,781 B1* | 4/2003 | Chang et al. | 398/51 |
| 6,563,798 B1 | 5/2003 | Cheng | |
| 6,587,235 B1* | 7/2003 | Chaudhuri et al. | 370/216 |
| 6,597,689 B1 | 7/2003 | Chiu et al. | |
| 6,600,724 B1 | 7/2003 | Cheng | |
| 6,614,762 B1 | 9/2003 | Illiadis et al. | |
| 6,725,401 B1 | 4/2004 | Lindhorst-Ko | |
| 6,781,952 B2 | 8/2004 | Shirakawa | |
| 6,801,502 B1 | 10/2004 | Rexford et al. | |
| 6,826,196 B1 | 11/2004 | Lawrence | |
| 2002/0109879 A1* | 8/2002 | Wing So | 359/118 |

OTHER PUBLICATIONS

Mika Loukola, "Private Network-to-Network Interface," Helsinki University of Technology, Laboratory of signal processing and computer technology, 1997, Espoo, Finland.
"Method and Apparatus to Allow Connection Establishment Over Diverse Link Types", Inventor—Jeremy R. Lawrence; U.S. Appl. No. 09/295,210, filed Apr. 21, 1999 (Ref. No. 081862.P120).

(Continued)

*Primary Examiner*—Dzung Tran
(74) *Attorney, Agent, or Firm*—Blakely, Sokoloff, Taylor & Zafman LLP

(57) ABSTRACT

A first route is associated with a first channel of two or more channels in a first dense wavelength division multiplex (DWDM) link. A second route is associated with a second channel of the two or more channels in the first dense wavelength division multiplex (DWDM) link. A third route is associated with a third channel of two or more channels in a second dense wavelength division multiplex (DWDM) link. The first route, the second route and the third route provide similar connections. The first DWDM link is different from the second DWDM link. The third route is preselected as an alternate diverse route for a connection through the first route.

14 Claims, 10 Drawing Sheets

OTHER PUBLICATIONS

"Method to Enhance routing Control in PNNI Networks", Inventor(s)—Stephen Morrow, et al.; U.S. Appl. No. 10/179,059, filed Jun. 24, 2002 (Ref. No. 081862.P271).

Mike Loukola, "Private Network-to-Network Interface," http://www..tml.hut.fi/Opinnot/Tik-110.551/1997/pnni/, pp. 1-26 (Oct. 24, 2000).

William Stallings, "Data & Computer Communications," Fifth Edition, Chapter 15: Protocol and Architectures, pp. 510-520 (1997).

International Telecommunication Union (ITU). ITU-T, I.630. Series I: Integrated Services Digital Network—Maintenance Principles, ATM Protection Switching, 43 pages (Feb. 1999).

William Stallings, "Data & Computer Communications," Sixth Edition, pp. 540-549 (2000).

* cited by examiner

| Offset | Size (Octets) | Name | Function/Description |
|---|---|---|---|
| 0 | 2 | Type | Type = 7 (Physical Transport Identifier Information Group) |
| 2 | 2 | Length | Length of the IG |
| 4 | 4 | Data | Physical Transport Identifier |

| Offset | Size (Octets) | Name | Function/Description |
|---|---|---|---|
| 0 | 2 | Type | Type = 640 (system capabilities) |
| 2 | 2 | Length | |
| 4 | 2 | Length of system capabilities contents | Length of IEEE OUI + System Capabilities Information. |
| 6 | 3 | IEEE OUI | IEEE Organizationally Unique identifier, reference IEEE Standard 802-1990. |
| 9 | n | System capabilities information | This will contain the 8 byte Physical Transport identifier information. |
| 9 + n | 0...3 | Padding | The size of the Padding field is calculated using the following formula: (4-((5+n) modulus 4))modulus 4 |

| Offset | Size (Octets) | Name | Function/Description |
|---|---|---|---|
| 0 | 2 | Type | Type = 640 (system capabilities) |
| 2 | 2 | Length | |
| 4 | 2 | Length of system capabilities contents | Length of IEEE OUI + System Capabilities Information. |
| 6 | 3 | IEEE OUI | IEEE Organizationally Unique identifier, reference IEEE Standard 802-1990. |
| 9 | N | System capabilities information | The semantics of this field are administered by the organization identified by the OUI. |
| 9 + n | 0...3 | Padding | The size of the Padding field is calculated using the following formula: (4-((5+n) modulus 4))modulus 4 |

METHOD AND SYSTEM FOR DIVERSE ROUTE COMPUTATION

FIELD OF THE INVENTION

The present invention relates generally to field of network communication. More specifically, the present invention is directed to a method and a system for providing diverse secondary route when using transmission media that support multiple channels.

BACKGROUND

Generally, network traffic for a connection between two nodes is carried on a transmission link. Additional links are used to support additional connections. The transmission media for each link may be fiber, copper, or other transmission media. For example, when optical link is used, new fiber lines are used to accommodate additional connections. FIG. 1 is an exemplary illustration of multiple fiber connections between two switches. The eight ports in the switch 105 on the left side are connected to the eight ports in the switch 110 on the right side. While the approach of adding more connections and using more ports works, it is expensive. As the demand for bandwidth increase, there will not be any ports left to add new fiber connections.

Advance in network communication allows multiple connections or channels to be a single physical link. For example, Wavelength Division Multiplexing (WDM) is a technology that allows a single optical fiber to support multiple optical channels. WDM uses multiple lasers and transmits several wavelengths or colors of light (lamdas) simultaneously over a single optical fiber. FIG. 2A is an exemplary illustration of transmitting multiple signals using different wavelengths. Each wave length or channel travels within its unique color band, which is modulated by the data (text, voice, video, etc.). WDM systems (also referred to as DWDM systems) are capable of supporting multiple wavelengths. One wavelength is sufficient to transfer a 622 Mbit/s (OC-12), 2.5 Gbit/s (OC-48), 10 Gbit/s (OC-192), or 40 Gbit/s (OC-768) signal.

FIG. 2B is an exemplary illustration of DWDM using a single fiber. DWDM is important because it enables a single optical fiber to carry many times the amount of network traffic it could not otherwise. Signals from the different ports of the switch 205 are transmitted at slightly different wavelengths of light. These signals are multiplexed so that they can travel together on one fiber 220. At the other end of the fiber, the different wavelengths are separated, and the signals recovered by the switch 210. Thus with DWDM, upgrade costs can be reduced.

With DWDM comes a challenge of figuring out how to manage all of these high capacity channels running in parallel in a single optical fiber.

SUMMARY OF THE INVENTION

In one embodiment, a method for computing a diverse route is disclosed. A first route is associated with a first channel of two or more channels in a first dense wavelength division multiplex (DWDM) link. A second route is associated with a second channel of the two or more channels in the first dense wavelength division multiplex (DWDM) link. A third route is associated with a third channel of two or more channels in a second dense wavelength division multiplex (DWDM) link. The first route, the second route and the third route provide similar connections. The first DWDM link is different from the second DWDM link. The third route is preselected as an alternate diverse route for a connection through the first route.

Other objects, features and advantages of the present invention will be apparent from the accompanying drawings and from the detailed description which follows.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 5 is an exemplary table illustrating a physical transport identifier information group using private network to network (PNNI) routing protocol.

FIG. 6 is an exemplary table illustrating a system capabilities information group using PNNI.

FIG. 7 is an exemplary table illustrating a horizontal link information group using PNNI.

DETAILED DESCRIPTION

In one embodiment of the present invention, a method for computing diverse route in a network is disclosed. A fiber link may comprise multiple logical channels. A logical channel serves as a link between two nodes. Another logical channel connecting the same nodes using a different fiber link is preselected as a diverse alternate route. The two fiber links go through different DWDM equipments.

Figure 1:
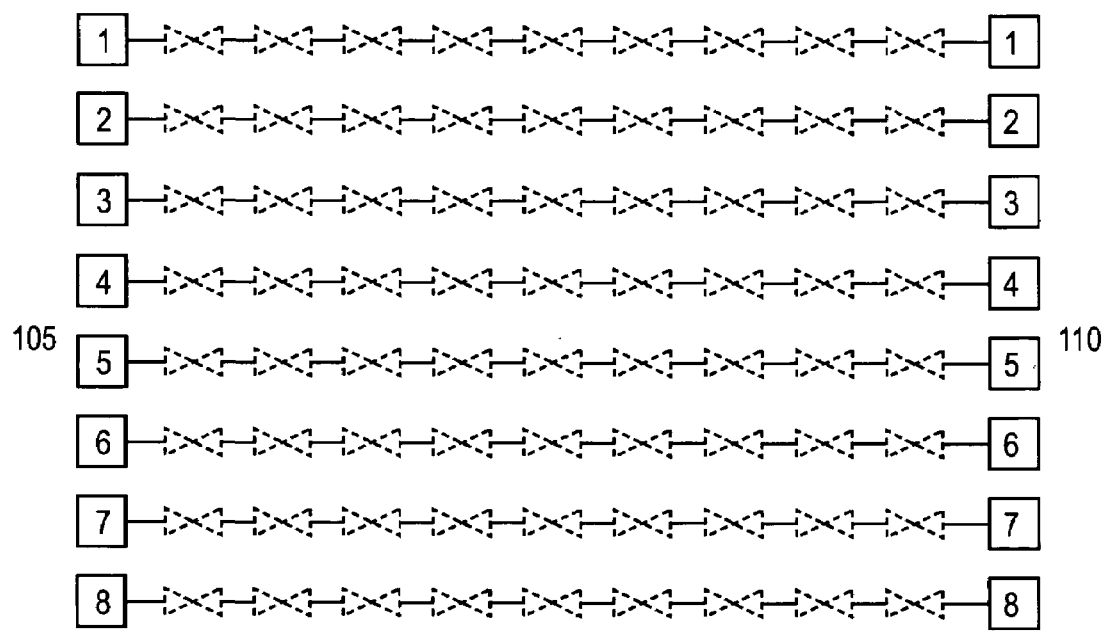
FIG. 1 is an exemplary illustration of multiple fiber connections between two switches.
Figure 2A:
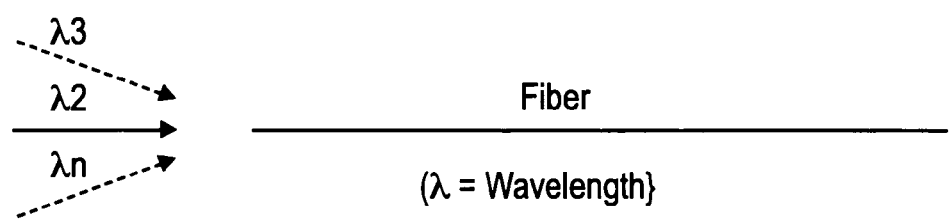
FIG. 2A is an exemplary illustration of transmitting multiple signals using different wavelengths
Figure 2B:
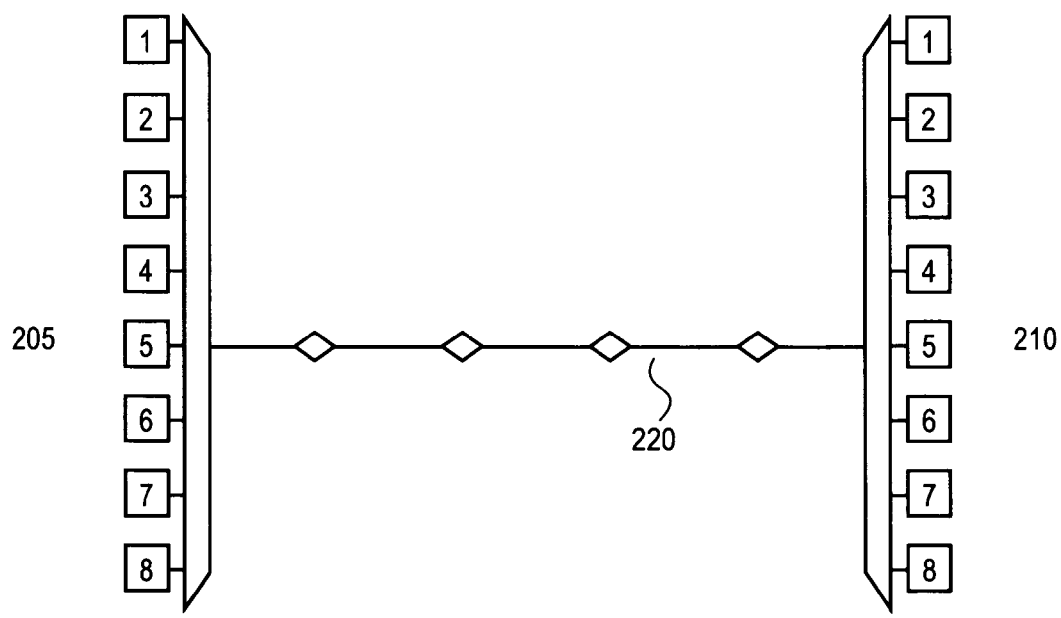
FIG. 2B is an exemplary illustration of DWDM using a single fiber.
Figure 3A:
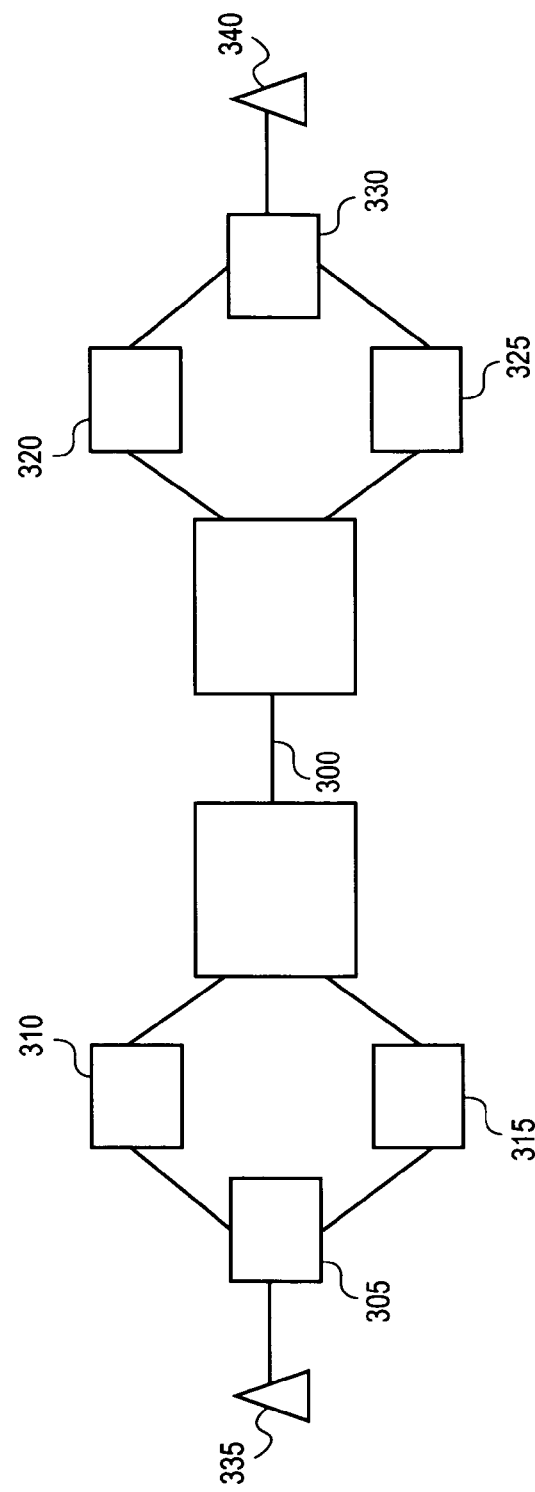
FIG. 3A is an exemplary diagram illustrating a network topology with a single fiber physical link.

FIG. 3A is an exemplary diagram illustrating a network topology with a single fiber physical link. Nodes 305, 310, 315 are connected to nodes 320, 325, 330 through the DWDM network using a single fiber link 300 (also referred to as a DWDM link). The nodes 335, 340 represent customer premise equipments (CPE). DWDM multiplexes multiple channels into a single DWDM link 300. Each channel is represented as a different wavelength over the DWDM link 300. The network views each channel as a separate logical link. For example, using a route look up procedure, there are two distinct routes from the CPE 335 to the CPE 340. The first route includes the following route segments: CPE 335 to node 305, node 305 to node 310, node 310 to node 320, node 320 to node 330, and node 330 to CPE 340. The second route includes the following route segments: CPE 335 to node 305, node 305 to node 315, node 315 to node 325, node 325 to node 330, and node 330 to CPE 340. The first route in the above example may be considered as a primary route or primary link between CPE 335 and CPE 340. Typically, the second route may be selected as an alternate route between CPE 335 and CPE 340.

Figure 3B:
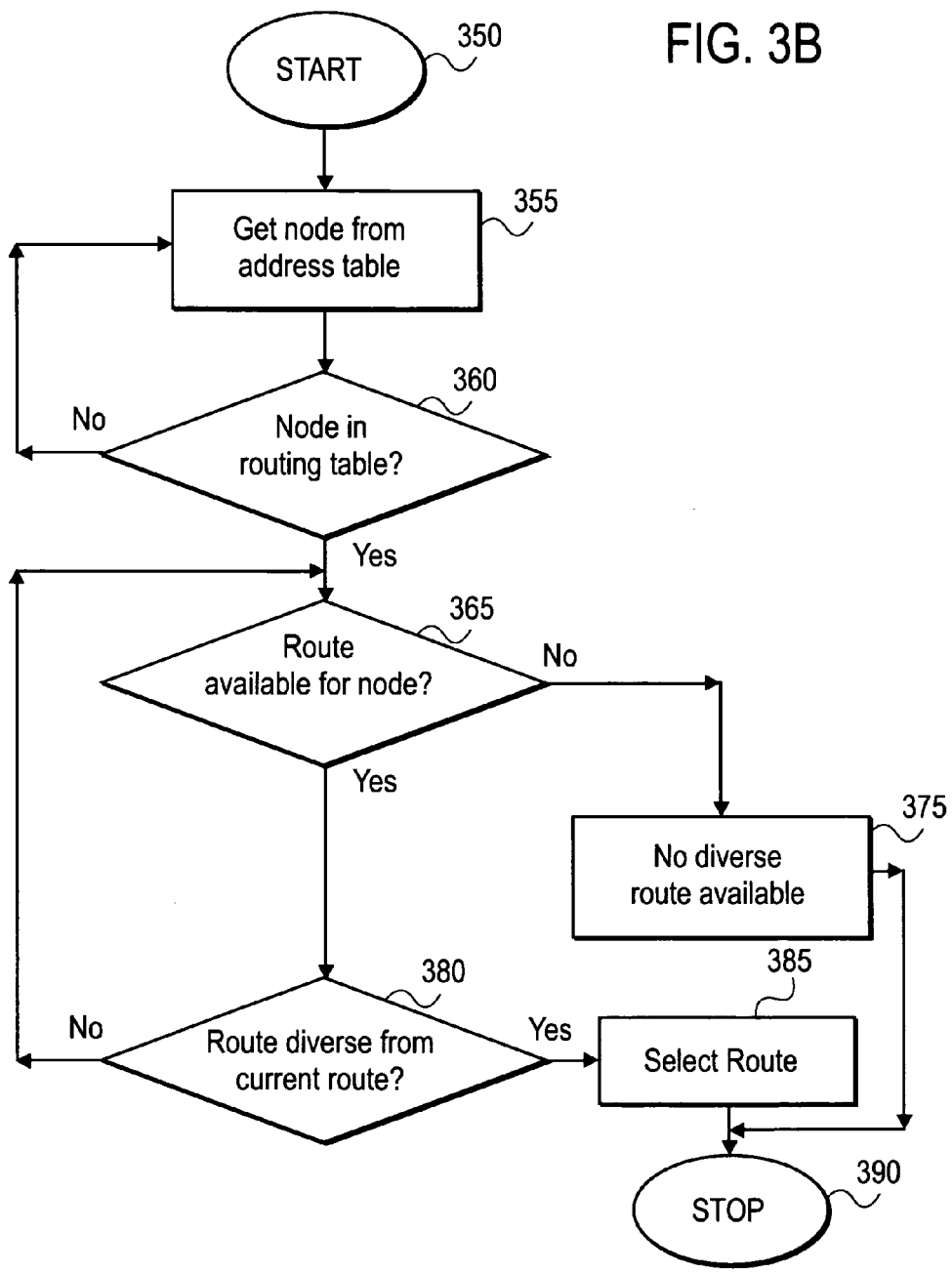
FIG. 3B is an exemplary flow diagram illustrating a route lookup procedure for a diverse route.

FIG. 3B is an exemplary flow diagram illustrating a route lookup procedure for a diverse route. The route look up procedure starts at block 350. At block 355, a node advertising a called address is retrieved from an address table. At block 360, a determination is made to see if the above node is in a routing table. If not, another node is retrieved from the address table. Otherwise, a determination is made to see if a route is available for the node, as shown in block 365. When there is no route, as shown in block 375, the route lookup procedure ends at block 390.

When there is a route, the route is selected for the connection. In some situations, there may be a requirement that when an alternate route is to be used, it must be completely diverse from a current route. For example, the I.630 protocol requires that a backup route be completely diverse from a primary route. A route is completely diverse from another route when there is no common route segments between the two routes. At block 380, a determination is made to see if the selected route is a diverse route as compared to a current route (i.e., the failing route). When the selected route is not a diverse route, the route lookup procedure moves to block 365 to see if another route can be selected. When the selected route is a diverse route, that route is used to re-establish the connection. The route lookup procedure ends at block 390. It should be noted that the diverse route may be selected when the primary route is established (e.g., during call setup or immediately after call setup).

Figure 4:
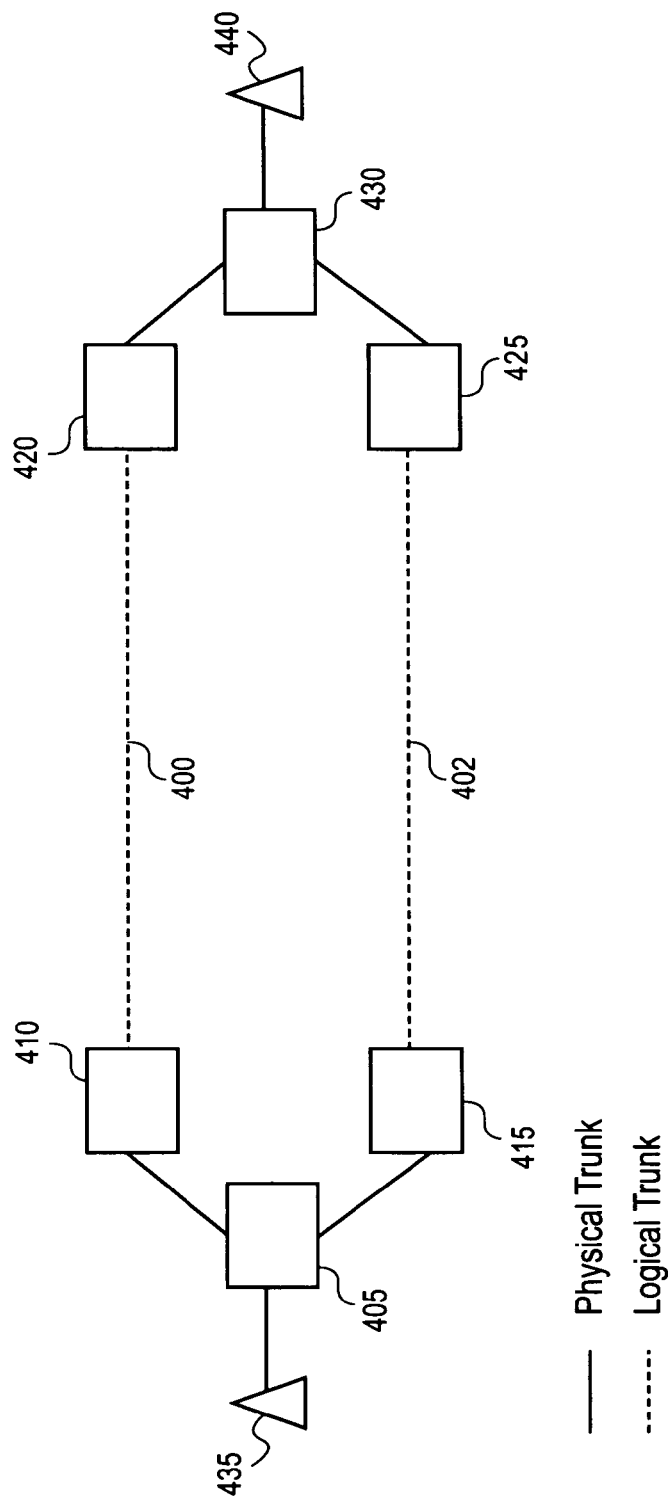
FIG. 4 is an exemplary diagram illustrating a network topology with logical links.

FIG. 4 is an exemplary diagram illustrating a network topology with logical links. FIG. 4 illustrates two logical links in the DWDM link 300 of FIG. 3A. For example, the first or current route uses the logical link 400 through nodes 405, 410, 420, 430 between CPE 335 and CPE 340. The second or alternate route uses the logical link 402 through nodes 405, 415, 425, 430 between CPE 335 and CPE 340. The first route and the second route described above are considered by routing protocols (e.g., Private Network-to-Network Interface (PNNI)) as diverse routes since they have no common route segment. As such, the second route using the logical link 402 can be selected as the diverse route for the first route.

However, this approach does not work when the logical link 400 and the logical link 402 share the same DWDM link. When the DWDM link is disconnected, both the logical link 400 and the logical link 402 are disconnected. As such, although the second route is a diverse route, it would be erroneous to choose the second route as the secondary or alternate route. Choosing the wrong second route would introduce additional delay and traffic loss before the connection between the CPE 435 and the CPE 440 is re-established.

In one embodiment, a physical link identifier is used to indicate the physical link that the logical link is associated with. By performing a physical link identifier comparison, the error of selecting a diverse second route that has the same common DWDM link as the first route can be prevented. This physical link identifier may be implemented in a routing protocol that is used with DWDM link. The physical link identifier is used during the route selection procedure to pre-select a diverse route. When the physical link identifiers of the primary route and the potential diverse route are different, the potential diverse route is selected. When the physical link identifiers of the primary route and the potential diverse route are similar, as in the case when a common DWDM link is used, the potential diverse route is not selected.

The routing protocol mentioned above may be, for example, the PNNI (Private Network-to-Network Interface) protocol. In this case, the physical link identifier may be implemented in the PNNI message or packet. There are different types of PNNI packets (e.g., hello, PTSP, PTSE, Database summary). A "packet type" field in a header of the PNNI packet identifies the packet type. With each packet type, there are information groups. For example, in the PTSE (Protocol Topology State Elements) packet type, the information groups include PTSE, nodal state parameters, nodal information group, outgoing resource availability, horizontal links, system capabilities, etc.

In one embodiment, when the PNNI routing protocol is used, the physical link identifier is specified in a physical transport identifier information group. FIG. 5 is an exemplary table illustrating the physical transport identifier information group. The physical transport identifier 505 (e.g., the physical link identifier) is the identifier of the transport mechanism. FIG. 6 is an exemplary table illustrating a system capabilities information group. The system capability information group includes a system capabilities information field 605 which can be used to carry system specific information such as, for example, the physical link identifier. The system capabilities information group in FIG. 6 can be used to propagate the physical link identifier by adding the information group to any PTSE.

FIG. 7 is an exemplary table illustrating a horizontal link information group. In one embodiment, the system capabilities information field 705 includes information in the physical transport identifier information group. A horizontal link is a link between two logical nodes that belong to the same peer group. Using the horizontal link information group, the information about the physical link identifier can be propagated to peer nodes. For example, when the DWDM link (i.e., fiber link) is configured for a logical link 400 in FIG. 4, the fiber id is used to update the physical link identifier field. Thus, the physical link identifier is embedded in the horizontal link information group. This physical link identifier is used to pre-select the diverse alternate route.

Although the above discussion uses PNNI as the exemplary routing protocol, one skilled in the art would recognize that the physical link identifier technique may be implemented with other routing protocols to determine diverse routes when DWDM is used.

Figure 8A:
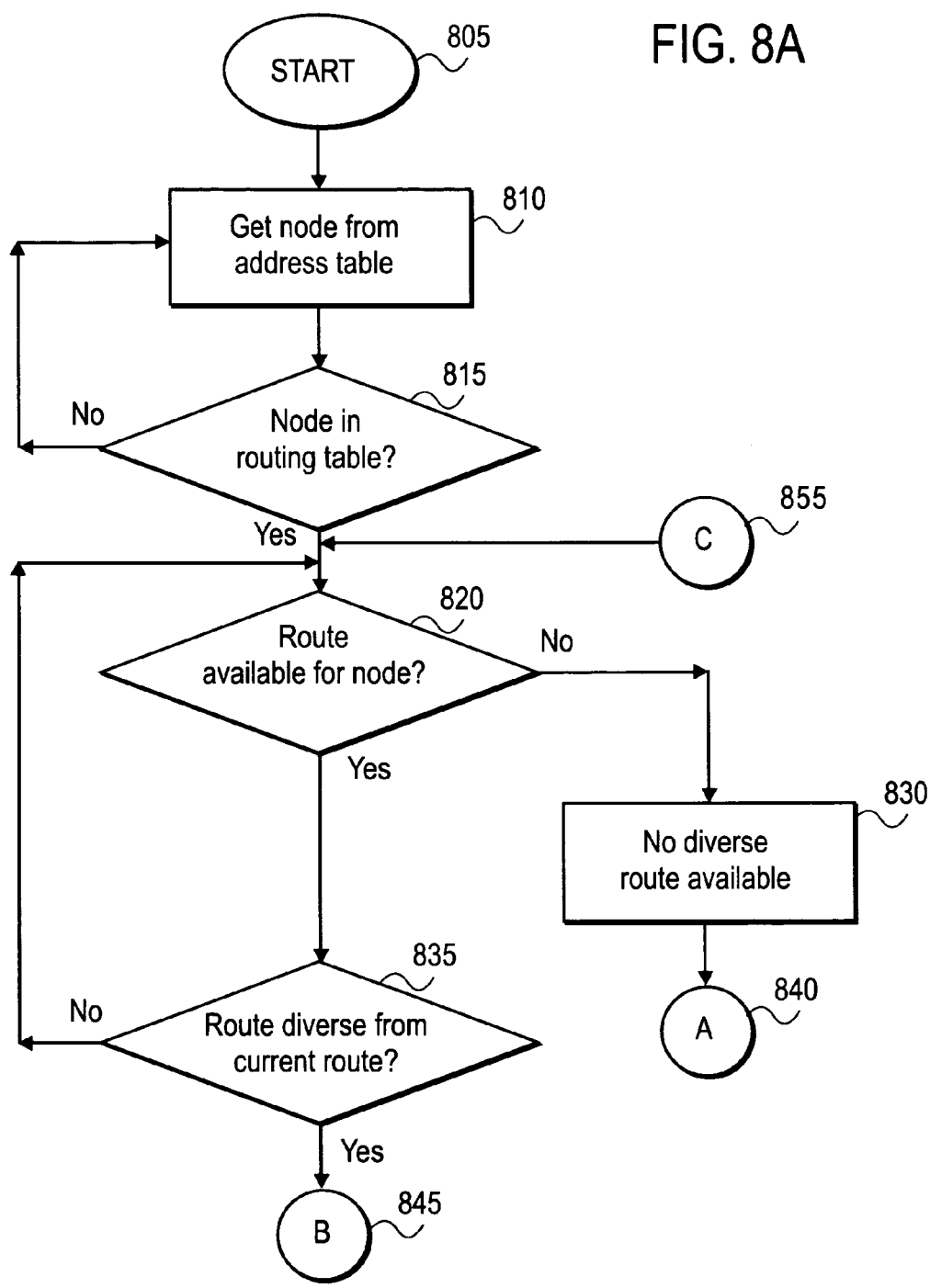
FIGS. 8A & 8B illustrate an exemplary flow diagram for a route lookup procedure to pre-select a diverse route using physical link identifier.
Figure 8B:
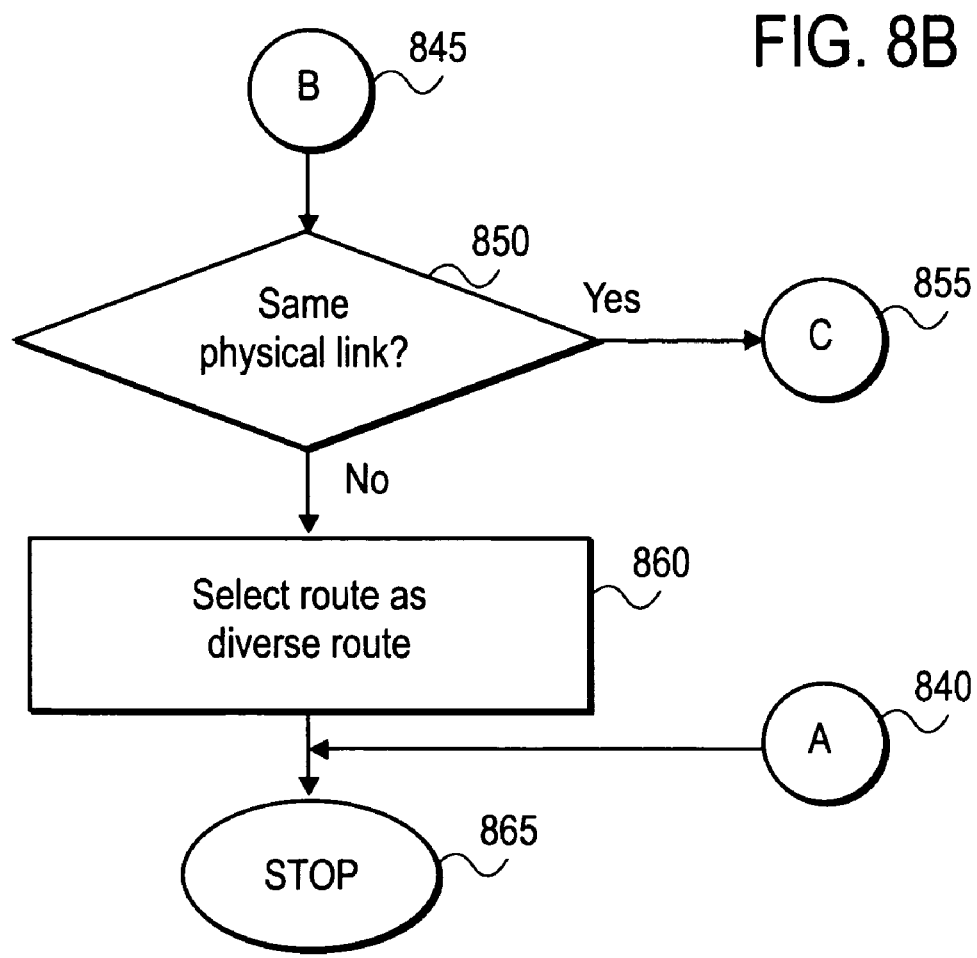

FIGS. 8A & 8B illustrate an exemplary flow diagram for a route lookup procedure to pre-select a diverse route using physical link identifier. The route lookup procedure starts at block 805. This route lookup procedure performs the same operations from block 810 to block 845 as the route lookup procedure illustrated in FIG. 3B. However, from block 845, instead of selecting the route as the diverse route, a physical link identifier of the selected route is compared with a physical link identifier of the current route, as shown in block 850. When the two physical link identifiers are the same, this indicates that they share the same DWDM link. In this situation, the selected route cannot be used even though it is a diverse route. The route lookup procedure moves to block 855, which leads to block 820 to see if another route is available. When the comparison in block 850 indicates that the two physical link identifiers are different, this indicates that the two route use different fiber links and therefore the selected route is truly a diverse route. At block 860, the route is selected as the alternate route. This selection is made because the route goes through different DWDM equipments. The route lookup procedure ends at block 865. It would be appreciated to note that the alternate diverse route is preselected to minimize delay when the primary route fails.

Figure 9:
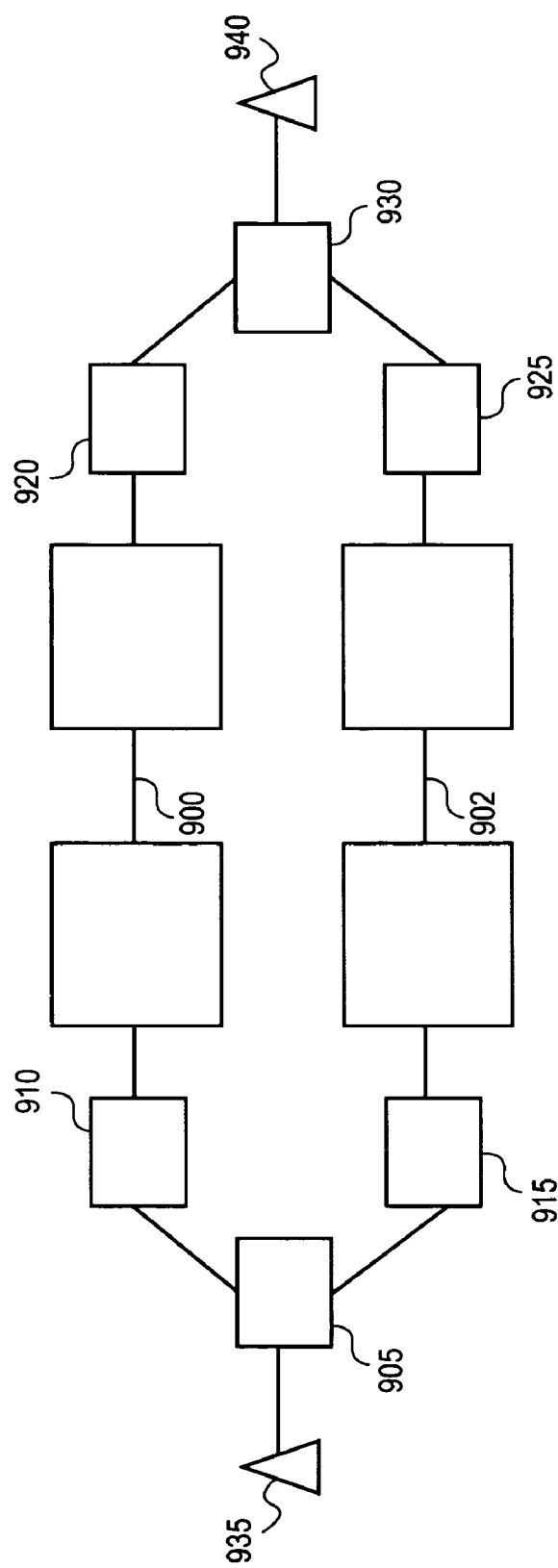
FIG. 9 is an exemplary diagram illustrating a network topology with two diverse route fiber physical links.

FIG. 9 is an exemplary diagram illustrating a network topology with two diverse route fiber physical links. The first route from CPE 935 to CPE 940 through the nodes 905, 910, 920 and 930 uses a fiber physical link 900. The second route from CPE 935 to CPE 940 through the nodes 905, 915, 925 and 930 uses a different fiber link 902. Even though the fiber physical link 900 may have multiple logical links connecting nodes 910 and 920, using the physical link identifier technique above, none of these logical links will be pre-selected as the secondary or alternate diverse route. Instead, the second route using the fiber physical link 902 will be pre-selected as the alternate diverse route. This eliminates down time.

The method described above can be stored in the memory of a computer system as a set of instructions (i.e., software). The set of instructions may reside, completely or at least partially, within the main memory and/or within the processor to be executed. In addition, the set of instructions to perform the methods described above could alternatively be stored on other forms of machine-readable media. For the purposes of this specification, the term "machine-readable media" shall be taken to include any media which is capable of storing or embodying a sequence of instructions for execution by the machine and that cause the machine to perform any one of the methodologies of the present invention. The term "machine readable media" shall accordingly be taken to include, but not limited to, optical and magnetic disks.

Alternatively, the logic to perform the methods as discussed above, could be implemented in additional computer and/or machine readable media, such as, for example, discrete hardware components as large-scale integrated circuits (LSI's), application-specific integrated circuits (ASIC's), firmware such as electrically erasable programmable read-only memory (EEPROM's), and electrical, optical, acoustical and other forms of propagated signals (e.g., carrier waves, infrared signals, digital signals, etc.), etc.

Although the above discussion refers to fiber link and DWDM, it would be apparent to one skilled in the art that the method of the present invention can also be used with other transmission media such as, for example, copper, etc., that is capable of supporting multiple logical channels.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method comprising:
 a Private Network-to-Network Interface (PNNI) route lookup procedure for a diverse route in an ATM network, wherein the procedure includes associating a first route with a first channel of two or more channels in a first dense wavelength division multiplex (DWDM) link;
 associating a second route with a second channel of the two or more channels in the first dense wavelength division multiplex (DWDM) link;
 associating a third route with a third channel of two or more channels in a second dense wavelength division multiplex (DWDM) link, the first route, the second route and the third route providing similar connections, the first DWDM link being different from the second DWDM link, the first DWDM link is associated with a first physical link identifier and the second DWDM link is associated with a second physical link identifier;
 propagating the first and second physical link identifiers to nodes of the ATM network, within system capabilities information fields of PNNI PTSE packets; and
 selecting the third route instead of the second route as a diverse alternate route to re-establish a connection that used the first route, by comparing the first physical link identifier with the second physical link identifier within received PTSE packets.

2. The method of claim 1, wherein the first physical link identifier is implemented in a horizontal link information group.

3. A method of preselecting a diverse alternate route when using dense wavelength division multiplex (DWDM), comprising:
 assigning a first physical link identifier received within a system capabilities information group of a PNNI PTSE packet to a first route, the first route using a channel in a first DWDM fiber link;
 assigning a second physical link identifier received within a system capabilities information group of a PNNI PTSE packet to a second route, the second route using a channel in a second DWDM fiber link, wherein the second route and the first route have no common route segment; and
 comparing the received first physical link identifier with the received second physical link identifier to select a diverse alternate route for the first route, wherein when the first physical link identifier is different from the second physical link identifier, the second route is selected as the diverse alternate route.

4. The method of claim 3, wherein the first route and the diverse alternate route provide connections to similar nodes.

5. A computer readable medium having stored thereon sequences of instructions which are executable by a digital processing system, and which, when executed by the digital processing system, cause the system to perform a method for preselecting a diverse alternate route when using dense wavelength division multiplex (DWDM), comprising:
 receiving first and second physical link identifiers within system capabilities information fields of PNNI PTSE packets;
 assigning the received first physical link identifier to a first route, the first route using a channel in a first DWDM fiber link;
 assigning the received second physical link identifier to a second route, the second route using a channel in a second DWDM fiber link, wherein the second route and the first route have no common route segment; and
 comparing the first physical link identifier with the second physical link identifier to select a diverse alternate route for the first route, wherein when the first physical link identifier is different from the second physical link identifier, the second route is selected as the diverse alternate route.

6. The computer readable medium of claim 5, wherein the first route and the diverse alternate route provide connections to similar nodes.

7. The computer readable medium of claim 5, wherein the first physical link identifier is implemented in a horizontal link information group.

8. A method, comprising:
associating a first route with a first channel of two or more channels in a first physical link;
associating a second route with a second channel of two or more channels in a second physical link, the first route and the second route providing connections to similar nodes;
receiving first and second physical link identifiers within system capabilities information fields of PNNI PTSE packets; and
selecting the second route as a diverse alternate route for the first route to re-establish a connection upon failure of the first route, by comparing the received first physical link identifier that is associated with the first route, with the received second physical link identifier that is associated with the second route and selecting the second route when the first physical link identifier is different from the second physical link identifier.

9. The method of claim 8, wherein the second route is selected as the diverse alternate route for the first route before the first route fails.

10. A computer system, comprising:
a bus;
a data storage device coupled to the bus; and
a processor coupled to the data storage device, the processor operable to receive instructions which, when executed by the processor, cause the processor to perform a PNNI signaling method comprising:
associating a first route with a first channel of two or more channels in a first physical link;
associating a second route with a second channel of two or more channels in a second physical link, the first route and the second route providing connections to similar nodes;
receiving first and second physical link identifiers within system capabilities information fields of PNNI PTSE packets; and
selecting the second route as a diverse alternate route to re-establish a connection that used the first route, by comparing the received first physical link identifier that is associated with the first route, with the received second physical link identifier that is associated with the second route and selecting the second route when the first physical link identifier is different from the second physical link identifier.

11. The system of claim 10, wherein the second route is selected as the diverse alternate route for the first route before the first route fails.

12. A computer system, comprising:
means for associating a first route with a first channel of two or more channels in a first physical link;
means for associating a second route with a second channel of two or more channels in the second physical link, the first route and the second route providing connections to similar nodes;
means for receiving first and second physical link identifiers within system capabilities information fields of PNNI PTSE packets; and
means for selecting the second route as a diverse alternate route to re-establish a connection upon failure of the first route, including means for comparing the received first physical link identifier that is associated with the first route, with the received second physical link identifier that is associated with the second route and means for selecting the second route when the first physical link identifier is different from the second physical link identifier.

13. The system of claim 12, wherein means for comparing the first physical link with the second physical link comprises means for associating the first physical link with a first physical link identifier and means for associating the second physical link with a second physical link identifier.

14. The system of claim 12, wherein the second route is selected as the diverse alternate route for the first route before the first route fails.

\* \* \* \* \*